(12) United States Patent
Huang et al.

(10) Patent No.: US 8,434,376 B2
(45) Date of Patent: May 7, 2013

(54) KEYBOARD TESTING SYSTEM

(75) Inventors: Teng-Tsung Huang, New Taipei (TW);
Guo-Jun Yu, Shenzhen (CN);
Yong-Bing Hu, Shenzhen (CN);
Yuan-Zhao Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 81 days.

(21) Appl. No.: 13/207,182

(22) Filed: Aug. 10, 2011

(65) Prior Publication Data

US 2012/0198948 A1    Aug. 9, 2012

(30) Foreign Application Priority Data

Feb. 8, 2011    (CN) .......................... 2011 1 0047662

(51) Int. Cl.
*G01M 99/00*    (2011.01)
(52) U.S. Cl.
USPC ....................................................... 73/865.3

(58) Field of Classification Search ........................ None
See application file for complete search history.

(56) References Cited

U.S. PATENT DOCUMENTS

| | | | | |
|---|---|---|---|---|
| 3,597,981 A * | 8/1971 | Wakabayashi et al. | ...... | 73/865.9 |
| 5,827,983 A * | 10/1998 | Ortoli | .......................... | 73/865.3 |
| 6,304,830 B1 * | 10/2001 | Lee | ............................... | 702/114 |
| 6,314,825 B1 * | 11/2001 | Fan | ............................... | 73/865.3 |
| 6,581,483 B1 * | 6/2003 | Yeh | ............................... | 73/865.3 |

* cited by examiner

*Primary Examiner* — Robert R Raevis
(74) *Attorney, Agent, or Firm* — Altis Law Group, Inc.

(57) ABSTRACT

A keyboard testing system includes a chassis; a retaining board; a plurality of guiding rods mounted between the chassis and the retaining board; a platform; a lifting device mounted on the chassis to drive the platform to move toward and away from the chassis; a motor mounted in the control box; a transmission device mounted in the control box; a key testing device movably mounted on the guiding rod. The motor drives the key testing device to move toward and away from the platform along the guiding rods by the transmission device.

16 Claims, 5 Drawing Sheets

KEYBOARD TESTING SYSTEM

BACKGROUND

1. Technical Field

This disclosure relates to keyboard testing systems, and in particular, to a system for automatically testing a keyboard.

2. Description of Related Art

Keyboards have been widely used to serve as an interface between a user and an electronic apparatus, such as personal computer, industrial controller, and cash registers. An incorrectly operating keyboard may lead to incorrect data input and can cause serious damage to the electronic apparatus. Conventionally, a keyboard is manually tested by an operator. Since the keys are manually depressed for testing, the downward force applied to different keys may vary from test operator to test operator or even key to key from the same test operator. Therefore, test results may be inaccurate.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary keyboard testing system. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
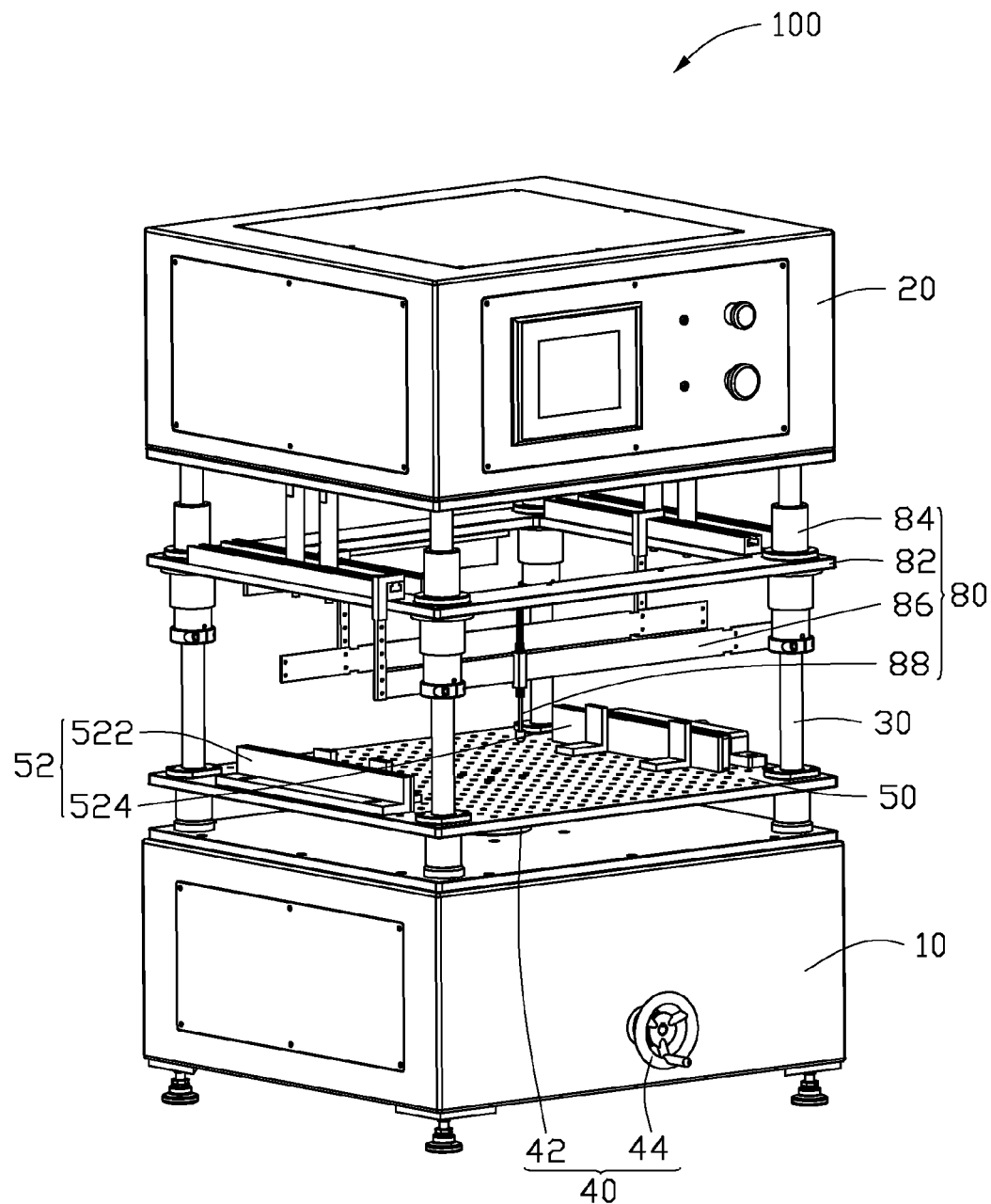
FIG. 1 is a schematic view of an exemplary embodiment of a keyboard testing system.
Figure 2:
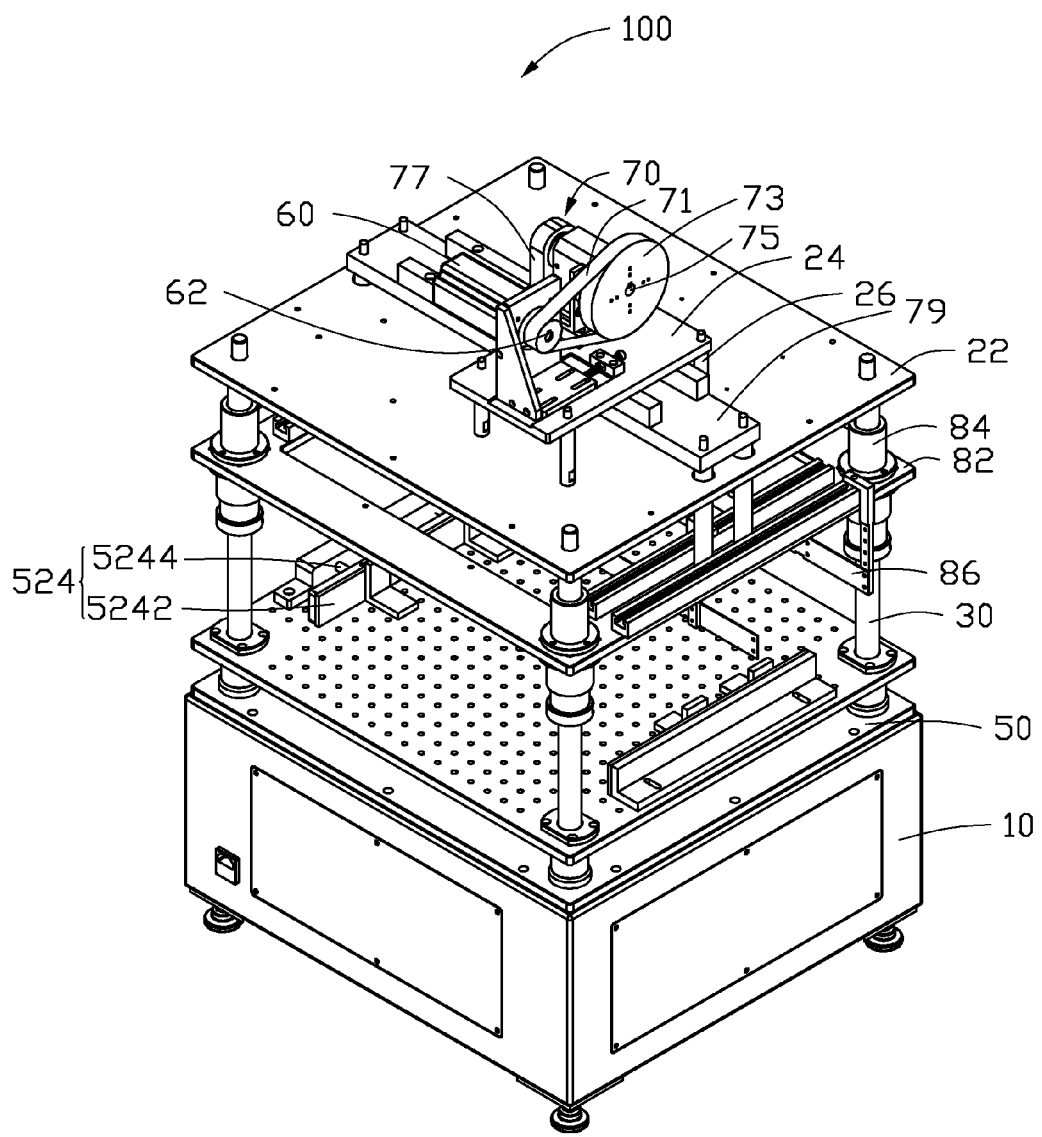
FIG. 2 is a partially exploded view of the keyboard testing system of FIG. 1.

Referring to FIGS. 1 and 2, an exemplary embodiment of a keyboard testing system 100 for testing a keyboard of an electronic device. The keyboard testing system 100 includes a chassis 10, a control box 20, a plurality of guiding rods 30, a lifting device 40, a platform 50, a motor 60, a transmission device 70 and a key testing device 80. The guiding rods 30 are retained between the chassis 10 and the control box 20, the platform 50 is movably mounted on the guiding rods 30. The lifting device 40 is mounted on the chassis 10 and drives the platform 50 to move upward and downward along the guiding rods 30. The motor 60 and the transmission device 70 are both mounted in the control box 20. The transmission device 70 transmits a force from the motor 60 to the key testing device 80, to move the key testing device 80 to the key board whereby the keys may be tested sequentially. In other words, the motor 60 drives the key testing device 80 to move toward and away from the platform 50.

Figure 4:
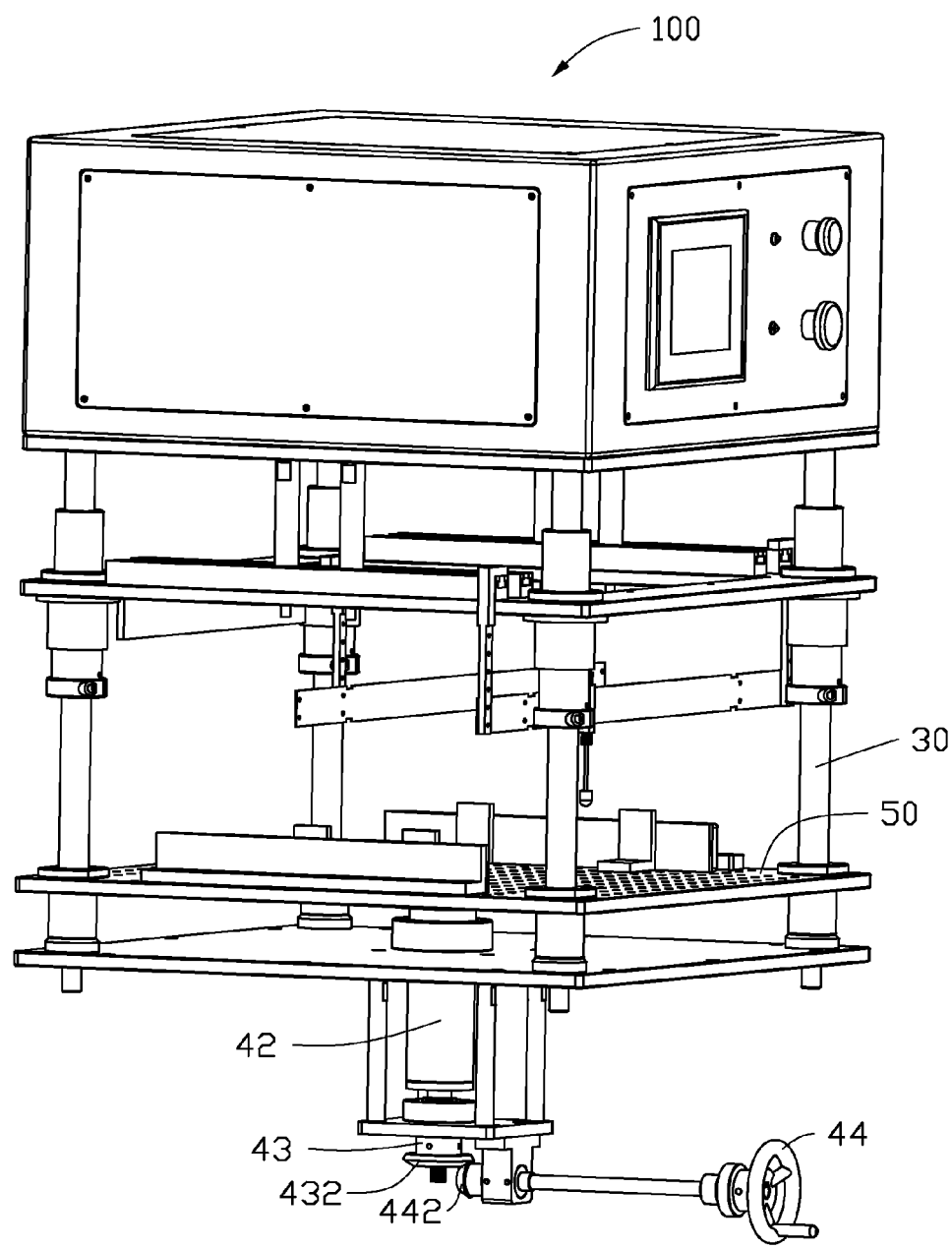
FIG. 4 is another partially exploded view of the keyboard testing system of FIG. 1.

The control box 20 includes a base 22 retained on the guiding rods 30, and a retaining board 24 mounted on the base 22 by a plurality of poles 26. Referring to FIG. 4, the lifting device 40 includes a lifting shaft 42 retained, on the platform 50, a sleeve 43 screwed on the lifting shaft 42, and a handle 44 is exposed outside of the chassis 10. The sleeve 43 includes a first cone gear 432, and the handle 44 includes a second cone gear 442 for engaging the first cone gear 432. When the handle 44 rotates, the second cone gear 442 engages the first cone gear 432 to drive the sleeve 43 to rotate, which causes the lifting shaft 42 and the platform 50 to move and adjust the position between the platform 50 and the base 22.

Referring to FIGS. 1 and 2, the platform 50 has a positioning mechanism 52 including a positioning board 522 retained on the platform 50 and a securing assembly 524 spaced from the positioning board 522. The securing assembly 524 includes a securing board 5242 movably mounted on the platform 50, and a threaded rod 5244 screwed on the platform 50 and retained on the securing board 5242. When the threaded rod 5244 rotates, the threaded rod 5244 drives the securing board 5242 to move relative to the positioning board 522, to adjust the distance between the positioning board 522 and the securing board 5242. Thus the positioning mechanism 52 can secure keyboards having different sizes.

Figure 3:
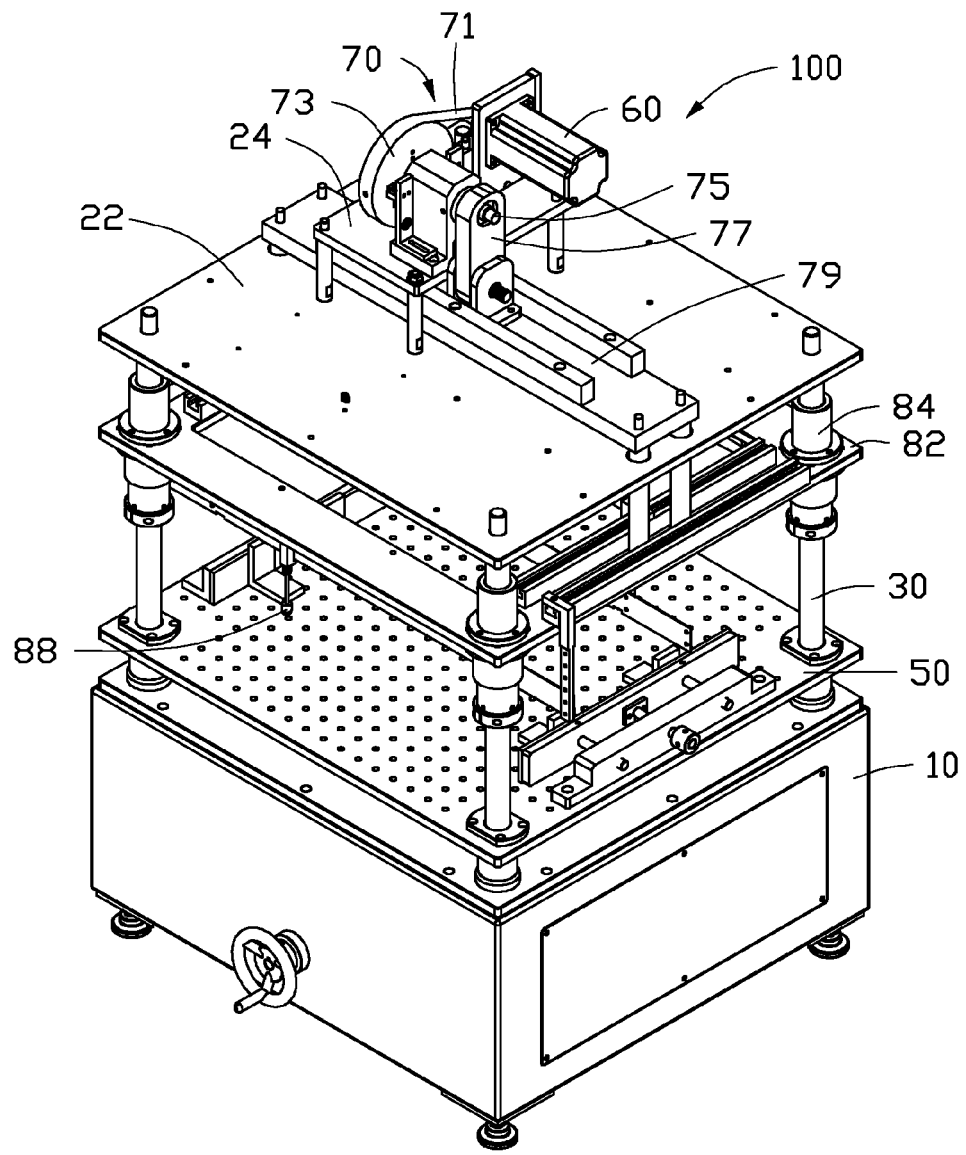
FIG. 3 is another schematic view of the keyboard testing system of FIG. 2 viewing from another aspect.
Figure 5:
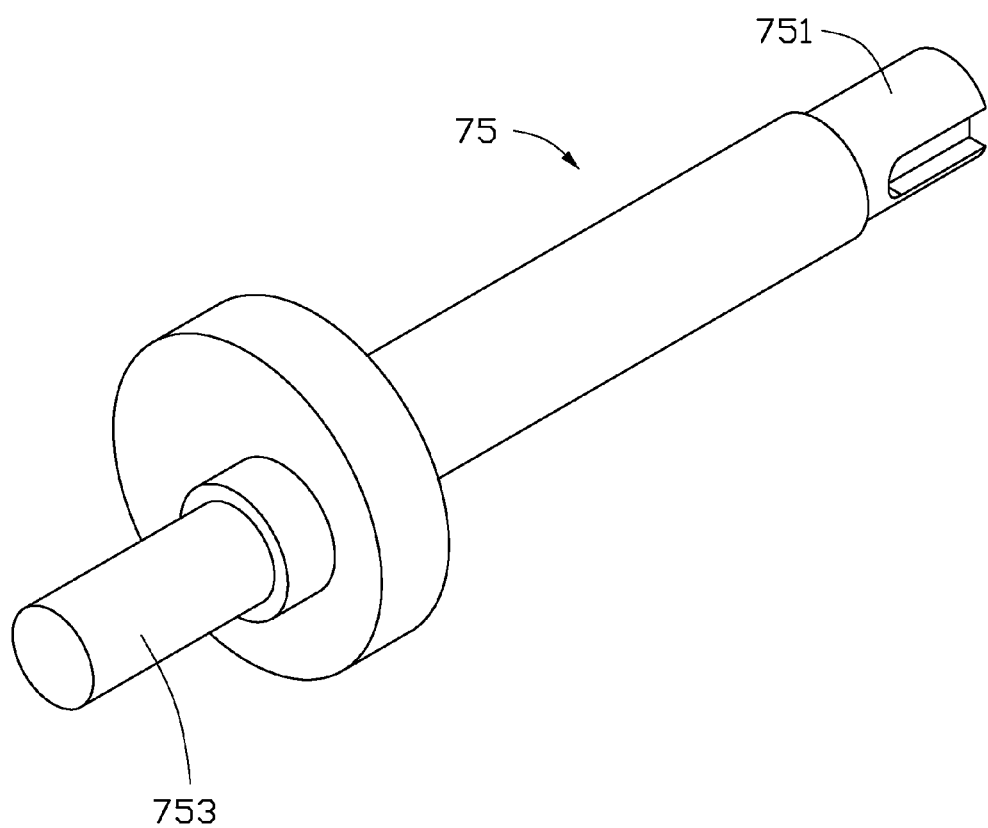
FIG. 5 is an enlarged isometric view of a crankshaft of the keyboard testing system of FIG. 3.

Referring to FIGS. 2, 3 and 5, the motor 60 includes an driving pulley 62. The transmission device 70 includes a belt 71, and the transmission device 70 is sequentially connected to a driven pulley 73, a crankshaft 75, a pendulum rod 77, and a connecting element 79. The driven pulley 73 connects to the driving pulley 62 by the belt 71. The crankshaft 75 includes a driving end 751 and a driven end 753. The driven pulley 73 is retained on the driving end 751. One end of the pendulum rod 77 is hinged on the driven end 753, the other end is retained on the connecting element 79.

The key testing device 80 includes a loading board 82, a plurality of bushings 84, a support beam 86, and a pressing element 88. The connecting element 79 passes through the base 22 and is retained on the loading board 82. The loading board 82 is retained on the bushings 84. Each bushing 84 is movably mounted on one of the guiding rods 30. The support beam 86 is retained on the loading board 82, the pressing element 88 is movably mounted on the support beam 86. When the motor 60 drives the connecting element 79 to move by the crankshaft 75, the connecting element 79 drives the loading board 82 to move up and down along the guiding rods 30 so the pressing element 88 moves towards and test the keyboard. The pressing element 88 can move along the support beam 86 adjusting the horizontal position of the pressing element 88 and relative to the keys of the keyboard.

In use, the keyboard is retained on the platform 50 by the positioning mechanism 52. The motor 60 drives the pressing element 88 to move to the movement extent of pressing element 88. The handle 44 is rotated to make the platform 50 move toward the pressing element 88 until the keyboard resists the pressing element 88 and the force applied to the keyboard satisfies the testing requirement. The motor 60 starts again. The driving pulley 62 drives the driven pulley 73 to rotate by the belt 71, and the driven pulley 73 drives the crankshaft 75 to rotate. As the crankshaft 75 rotates, the pendulum rod 77 drives the connecting element 79 and the loading board 82 to move up and down along the guiding rods 30, which causes the pressing element 88 to test the key of the key board with which the pressing element 88 is aligned. To check next key of the keyboard, the pressing element 88 is moved along the support beam 86, such as manually, until the pressing element 88 is aligned with the next key, and then above operation is repeated to check the next key.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A keyboard testing system comprising:
a chassis;
a control box;
a plurality of guiding rods mounted between the chassis and the control box;
a platform movably mounted on the guiding rods;
a lifting device mounted on the chassis to drive the platform to move up and down along the guiding rods;
a motor mounted in the control box;
a transmission device mounted in the control box;
a key testing device;
wherein the transmission device transmits a force from the motor to the key testing device, to move the key testing device along the guiding rods.

2. The keyboard testing system of claim 1, wherein the motor further comprises a driving pulley; the transmission device comprises a belt and a driven pulley connected to the driving pulley by the belt.

3. The keyboard testing system of claim 2, wherein the transmission device further comprises a crankshaft, a pendulum rod and a connecting element; the crankshaft includes a driving end and a driven end, the driven pulley is retained on the driving end; one end of the pendulum rod is hinged on the driven end, the other end is retained on the connecting element.

4. The keyboard testing system of claim 3, wherein the key testing device comprises a loading board, a plurality of bushings, a pressing element; each bushing is movably mounted on one of the guiding rods, the loading board is retained on the bushings and connected to the connecting element, the pressing element is connected to the loading board.

5. The keyboard testing system of claim 4, wherein the key testing device further comprises a support beam retained on the loading board, the pressing element is movably mounted on the support beam.

6. The keyboard testing system of claim 1, wherein the lifting device comprises a lifting shaft retained on the platform, and a handle exposed out of the chassis; when the handle rotates, causing the lifting shaft and the platform moving to adjust position between the platform and the base.

7. The keyboard testing system of claim 1, wherein the platform has a positioning mechanism including a positioning board retained on the platform and a securing assembly spaced from the positioning board.

8. The keyboard testing system of claim 7, wherein the securing assembly includes a securing board movably mounted on the platform, and a threaded rod screwed on the platform and retained on the securing board; when the threaded rod rotates, the threaded rod drives the securing board to move relative the positioning board, to adjust a distance between the positioning board and the securing board.

9. A keyboard testing system comprising:
a chassis;
a control box including a base, and a retaining board mounted on the base;
a plurality of guiding rods mounted between the chassis and the base;
a platform;
a lifting device mounted on the chassis to drive the platform to move toward and away from the chassis;
a motor mounted in on the retaining board;
a transmission device mounted on the retaining board;
a key testing device movably mounted on the guiding rods;
wherein the motor drives the key testing device to move toward and away from the platform along the guiding rods by the transmission device.

10. The keyboard testing system of claim 9, wherein the motor further comprises a driving pulley; the transmission device comprises a belt and a driven pulley connected to the driving pulley by the belt.

11. The keyboard testing system of claim 10, wherein the transmission device further comprises a crankshaft a pendulum rod and a connecting element; the crankshaft includes a driving end and a driven end, the driven pulley is retained on the driving end; one end of the pendulum rod is hinged on the driven end, the other end is retained on the connecting element.

12. The keyboard testing system of claim 11, wherein the key testing device comprises a loading board, a plurality of bushings, a pressing element; each bushing is movably mounted on one of the guiding rods, the loading board is retained on the bushings and connected to the connecting element, the pressing element is connected to the loading board.

13. The keyboard testing system of claim 12, wherein the key testing device further comprises a support beam retained on the loading board, the pressing element is movably mounted on the support beam.

14. The keyboard testing system of claim 9, wherein the lifting device comprises a lifting shaft retained on the platform, and a handle exposed out of the chassis; when the handle rotates, causing the lifting shaft and the platform moving to adjust position between the platform and the base.

15. The keyboard testing system of claim 9, wherein the platform has a positioning mechanism including a positioning board retained on the platform and a securing assembly spaced from the positioning board.

16. The keyboard testing system of claim 15, wherein the securing assembly includes a securing board movably mounted on the platform, and a threaded rod screwed on the platform and retained on the securing board; when the threaded rod rotates, the threaded rod drives the securing board to move relative the positioning board, to adjust a distance between the positioning board and the securing board.

* * * * *